(12) United States Patent
Martin

(10) Patent No.: US 6,878,289 B2
(45) Date of Patent: Apr. 12, 2005

(54) METHOD OF REDUCING CHEMICAL OXYGEN DEMAND IN WATER

(75) Inventor: Perry L. Martin, Yuba City, CA (US)

(73) Assignee: TRUOX, Inc., McClellan, CA (US)

( * ) Notice: Subject to any disclaimer, the term of this patent is extended or adjusted under 35 U.S.C. 154(b) by 0 days.

(21) Appl. No.: 10/878,167

(22) Filed: Jun. 28, 2004

(65) Prior Publication Data

US 2005/0035067 A1 Feb. 17, 2005

Related U.S. Application Data

(60) Provisional application No. 60/495,083, filed on Aug. 13, 2003.

(51) Int. Cl.[7] .................................................. C02F 1/72
(52) U.S. Cl. ........................................ 210/759; 210/169
(58) Field of Search .............................. 210/749, 758, 210/759, 169

(56) References Cited

U.S. PATENT DOCUMENTS 4,880,547 A * 11/1989 Etani .......................... 210/728

5,139,763 A * 8/1992 Amini ......................... 423/513

* cited by examiner

Primary Examiner—Robert A. Hopkins
(74) Attorney, Agent, or Firm—DLA Piper Rudnick Gray Cary US LLP

(57) ABSTRACT

A method of cleaning water systems and a potassium monopersulfate composition that is used for the method are presented. Potassium monopersulfate with a low concentration (<0.5 wt. %) of potassium oxodisulfate byproduct is used for the method. Due to the low potassium oxodisulfate concentration, the composition is not subject to stringent usage restrictions that are applied to currently available potassium monopersulfate compositions. Also presented is a polysaccharide coating that can be used to control the rate at which the potassium monopersulfate dissolves upon use. Using the coating, the potassium monopersulfate composition can be used continuously instead of in a periodic shock treatment as is currently done. The low oxodisulfate concentration allows the method to be used regardless of whether the water system is being used by bathers.

47 Claims, 6 Drawing Sheets

METHOD OF REDUCING CHEMICAL OXYGEN DEMAND IN WATER

RELATED APPLICATION

This application claims the benefit of U.S. Provisional Patent Application Ser. No. 60/495,083 filed on Aug. 13, 2003 in accordance with the provisions of 35 U.S.C. § 119(e). The content of the provisional application is incorporated by reference herein.

FIELD OF INVENTION

This invention relates generally to cleaning a water system and more particularly to cleaning a water system that contains organic contaminants.

BACKGROUND

Water systems such as pools and spas have become increasingly popular in private homes, hotels, fitness centers, and resorts. To ensure that the water systems can be enjoyed safely, pool and spa water must be treated to reduce or eliminate chemical oxygen demands (COD) and/or total organic carbon (TOC) in the water. A common ingredient for treating water systems is potassium monopersulfate (PMPS), which is typically available in the form of a triple salt, $(KHSO_5)_x \cdot (KHSO_4)_y \cdot (K_2SO_4)_z$ (herein referred to as "PMPS triple salt"). The strong oxidation potential of PMPS triple salt makes it effective for decreasing the concentration of COD.

When treating water with PMPS, a high concentration of PMPS is added to the water to "shock" treat the water. A typical shock treatment dosage may be, for example, one pound of PMPS triple salt per 10,000 gallons of water per week. Although increasing the dosage makes the treatment more effective, the dosage cannot be increased beyond two pounds per 10,000 gallons of water per week because of the presence of potassium oxodisulfate $(K_2S_2O_8)$, an irritating byproduct of the PMPS triple salt. Potassium oxodisulfate, which is a harsh irritant with a long half life, is inherent in most commercially available PMPS products (e.g., Oxone®). To minimize the likelihood of bathers coming in contact with potassium oxodisulfate, the shock treatment is usually performed at least half an hour before the pool/spa is to be used.

Although this shock treatment method is highly inconvenient because of the necessary interruption of the pool/spa usage, it is a prevalent method of treatment because it minimizes bathers' contact with irritating components of the PMPS product. Potassium oxodisulfate is especially problematic not only because of its highly irritating quality but also because of its high stability. Unlike PMPS, which has a fairly short half-life at elevated pH and temperature, potassium oxodisulfate lingers around in the water long after the active ingredient of the PMPS is depleted. Potassium oxodisulfate, thus, limits the frequency of pool treatment and the method by which pools/spas can be treated. For example, pool treatment would be easier if the PMPS triple salt could be added continually, in smaller dosages, to a stream of water that circulates into the pool. However, due to the high stability of potassium oxodisulfate, applying even a small dosage of a commercially available PMPS product to the return water is likely to result in a local concentration of potassium oxodisulfate that is high enough to cause irritation.

Some physical and health consequences resulting from exposure to potassium oxodisulfate are documented in the following references:

Wrbitzky R., et al., "Early reaction type allergies and diseases of the respiratory passages in employees from persulphate production," *Int. Arch. Occup. Environ. Health*, Vol. 67(6):413–7 (1995).

Le Coz, C. J., Bezard M., "Allergic contact cheilitis due to effervescent dental cleanser: combined responsibilities of the allergen persulfate and prosthesis porosity," *Contact Dermatitis* Vol. 41(5):268–71 (November 1999).

"Consultation de Dermato-Allergologie," Clinique Dermatologique des Hopitaux, Universitaires de Strasbourg 1, France.

Yawalkar, N. et al., "T cell involvement in persulfate triggered occupational contact dermatitis and asthma," *Institute of Immunology and Allergology*, University of Bern, Inselspital, Switzerland.

In addition to the inconvenience of interrupted pool/spa usage, the periodic shock treatment has the problem of allowing the COD concentration to increase between shock treatments. Because the "shock treatment" cannot be performed too frequently, COD concentration can get too high for many bathers after a certain number of days from the previous treatment. During those days, water quality is compromised with increased levels of turbidity, chloroamines, and trihalomethane (THM). These byproducts of incomplete oxidation cause not only eye and skin irritation but also respiratory problems such as asthma. Moreover, these byproducts are known to cause severe corrosion of metal equipment around the pool/spa facility.

Furthermore, indirectly, potassium oxodisulfate weakens the effect of sanitizers that are used to disinfect water. Chlorine and bromine are some of the sanitizers that are commonly used for preventing viruses and bacteria from being transmitted among bathers, and chlorine is also used to oxidize any waste products produced by the bathers. In order for the antibacterial or vericidal effect to be significant, the oxidation potential of the water must be sustained above a certain threshold level. The following studies have confirmed that the effectiveness of these sanitizers is significantly reduced when contaminants is high:

S. Carlson, *Fundamentals of Water Disinfection*, D-8500 Nurnberg 30, Germany

K. Victorin, K. G. Hellstrom, and R. Rylander, "Redox potential measurements for determining the disinfecting power of chlorinated water," Department of Environmental Hydiene, The National Institute of Public Health and the Institute of Hygiene, Karolinska Institute, Stockholm, Sweden (October 1971).

Frank Scully, Jr. and Angela Crabb Hartman, "Disinfection Interference in Wastewater by Natural Organic Nitrogen Compounds," *Environmental Science and Technology*, vol. 30. No. 5, Department of Chemistry and Biochemistry, Old Dominion University, Norfolk Va. (1996) American Chemical Society.

Although PMPS has the ability to raise the oxidation potential of the water when many contamination sources (e.g., many bathers) lower the oxidation level, PMPS cannot be used because its use might increase the oxodisulfate level in the water to a range above the recommended level. The presence of contaminants impairs the ability of the sanitizer/oxidizer to effectively sanitize the water. Also, because of competing reactions, the ability of the halogen-based sanitizer/oxidizer to rid the water of inorganic nitrogen such as mono & dichloro amines is significantly impaired.

The currently-used periodic shock feeding method does not provide for sustained disinfection rates where contaminants is added between treatments. During the interval period between shock treatments, accumulating contaminants imposes a burden on the sanitizer/oxidizer and impairs the disinfection rate due to competing reactions. Also, as already noted, the competing reactions between accumulated organics and nitrogen contaminants for the sanitizer/oxidizer allows for increased levels of chloramines which impairs both water and air quality.

To address these issues, sophisticated control and application technologies have been employed to allow for more frequent feed of PMPS while bathers are present. The following references disclose some exemplary technologies:

U.S. Pat. No. 6,620,315 and U.S. Pat. No. 6,623,647 describe a method and apparatus that combined measuring ORP and Free Available Chlorine (FAC) to independently adjust the feed of multiple oxidizers such as chlorine and PMPS.

U.S. Pat. No. 6,409,926 and U.S. Pat. No. 6,432,234 describes a means of reducing the ORP set-point used to control the feed of the halogen based sanitizer to achieve breakpoint chlorination by feeding a coagulant to reduce the contaminants on chlorine.

U.S. Pat. No. 6,143,184 describes a process for achieving continuous breakpoint halogenation by optimizing the control of halogen-based sanitizer/oxidizer using ORP control.

U.S. Pat. No. 6,149,819 describes a process for achieving continuous breakpoint halogenation using halogen donor and PMPS controlled by an ORP controller.

In order to address the drop of oxidation potential between shock treatments, ORP control technology may be used to optimize the feed of chlorine and PMPS or coagulant to reduce the contaminants, thereby reducing the competing reactions and enhancing the chlorine's ability to achieve breakpoint chlorination. The ORP control technologies, however, have their disadvantages. For example, they require expensive chemical feed and control technology as well as extensive on-site maintenance and expertise to tune in or optimize the sequencing of the chemicals being fed.

A method of cleaning water without the expense of the ORP control technologies and restrictions of the shock treatment is desired.

SUMMARY

The invention includes a potassium monopersulfate composition that is not subject to the usage restrictions that are applicable to the currently available water system cleaners containing potassium monopersulfate. Due to the low potassium oxodisulfate concentration in the potassium monopersulfate composition of the invention, the composition may be used even while the water system (pools, spas, etc.) is being used. The rate at which the potassium monopersulfate dissolves is controlled by the type and thickness of a polysaccharide coating applied to the composition. The invention also includes a method of improving sanitation using a slow-dissolving PMPS composition for continuous water treatment with PMPS.

In one aspect, the invention is a method of reducing the chemical oxygen demand of a water system containing organic contaminants. The method includes generating a potassium monopersulfate composition having a $K_2S_2O_8$ concentration lower than 0.5 wt. % of the composition, and coating the potassium monopersulfate composition with a film to form a coated tablet. The material for the film is selected based on a target rate at which the coated tablet dissolves in a predetermined type of fluid.

In another aspect, the invention is a method of reducing the chemical oxygen demand in a water system containing organic contaminants. The method entails obtaining a tablet of a potassium monopersulfate core coated with a polysaccharide layer, and adding the tablet to the water system while a source that generates the organic contaminants is in the water system.

In yet another aspect, the invention is a kit for cleaning a water system containing organic contaminants. The kit includes a potassium monopersulfate tablet coated with a polysaccharide material and instructions to add the tablet to the water system regardless of whether a user is in the water system.

DESCRIPTION OF THE PREFERRED EMBODIMENT

Figure 1:
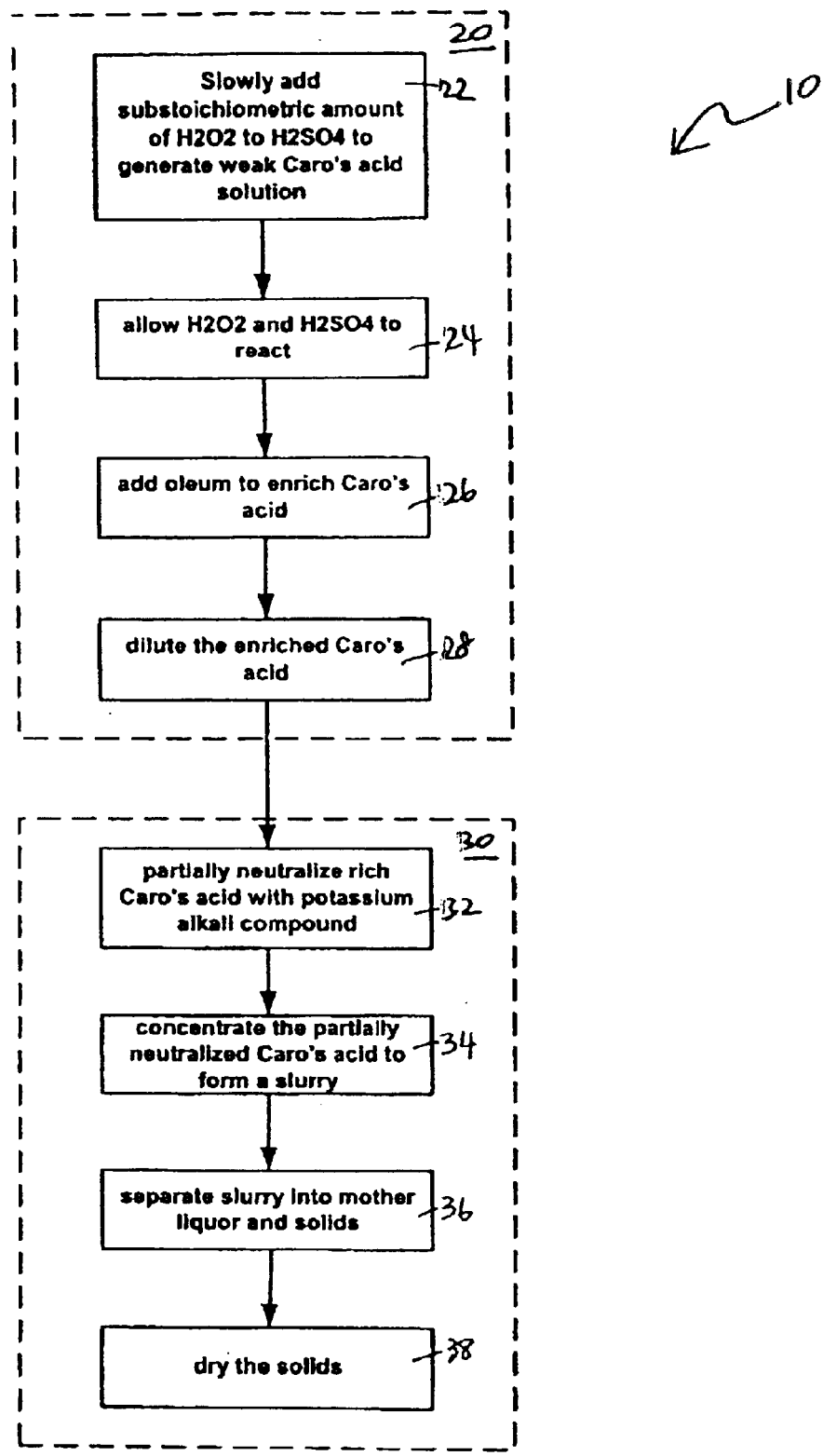
FIG. 1 is a flowchart of a triple salt production process that may be used to produce the potassium monopersulfate composition that is suitable for the invention.

As used herein, a "water system" is any facility including a body of water. A "contaminant" refers to a substance that reacts with and consumes a sanitizer/oxidizer, and often comes in the form of organic compounds generated by users. A "user" of a water system is a person or a mammal using the water system in manner that it is intended to be used.

As used herein, a "film" is any layer of a material. "Chemical oxygen demand" determines the oxygen ($O_2$) consumption as a result of both biodegradable and non-biodegradable organic matters in the water.

As used herein, a "potassium monopersulfate composition" is a composition that contains $KHSO_5$, including $KHSO_5$ in its triple salt form $(KHSO_5)_x \cdot (KHSO_4)_y \cdot (K_2SO_4)_2$. A "peroxide solution" and a "sulfuric acid solution" refer to solutions of $H_2O_2$ and water, and $H_2SO_4$ and water, respectively. "Oleum" refers to free $SO_3$ dissolved in $H_2SO_4$. A "Caro's acid solution" refers to Caro's acid ($H_2SO_5$) mixed with one or more of $H_2O_2$, $H_2O$, and $H_2SO_4$.

The terms "stabilizing" and "stabilized," when used in reference to the Caro's acid solution, indicate the suppression of the equilibrium reaction, or suppression of Reaction 1b (see below) that converts the $H_2SO_5$ back to the reactants. A "stable" potassium monopersulfate composition, on the other hand, has an active oxygen loss of <1% per month. "Non-hygroscopic" means having a K:S ratio greater than 1.

The invention provides a method of sustaining a desired level of oxidation potential in a contaminants-ridden water system. The invention uses a PMPS triple salt having the composition $(KHSO_5)_x \cdot (KHSO_4)_y \cdot (K_2SO_4)_z$ where $x+y+z=1$ and $x=0.43–0.75$, $y=0.01–0.37$, and $z=0.01–0.40$, and having a potassium oxodisulfate concentration of less than 0.5 wt. %, preferably less than 0.2 wt. %. The low oxodisulfate concentration allows the composition of the invention to be used for water treatment as frequently as desired and even continuously. The treatment method of the invention maintains a substantially constant chemical oxygen contaminants (COD) level in the water, eliminating the risk of irritation to bathers and improving the sanitation of the treated water.

Production of Low-oxodisulfate PMPS Triple Salt

Although there are several known methods of producing potassium monopersulfate, most of these methods produce potassium monopersulfate with an oxodisulfate concentration that is too high for the invention. An exemplary method of producing potassium monopersulfate that is suitable for this invention is provided in U.S. Provisional Patent Application Ser. No. 60/505,466 filed on Sep. 23, 2003 and U.S. patent application Ser. No. 10/878,169, which are incorporated by reference herein in their entirety.

The PMPS triple salt is produced from Caro's acid ($H_2SO_5$, also called peroxymonosulphuric acid), which in turn is usually produced by reacting $H_2SO_4$ with $H_2O_2$. Caro's acid is a product of the following two equilibrium reactions:

     (Reaction 1a)

     (Reaction 1b)

Reaction 1a is herein referred to as the "forward reaction," and Reaction 1b is herein referred to as the "reverse reaction." $H_2SO_4+H_2O_2$ are herein referred to as the "reactants." As the water content increases, the rate of forward reaction decreases. Also, as the concentrations of the reactants become reduced due to the forward reaction, the rate of the forward reaction decreases. The Caro's acid is reacted with alkali potassium salts such as $KHCO_3$, $K_2CO_3$, and/or $KOH$ to generate $KHSO_5$ according to the following reaction:

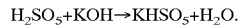

First Example of Low-oxodisulfate PMPS Production

The Caro's acid composition resulting from controlling the order of reactant addition (i.e., adding $H_2O_2$ to $H_2SO_4$) and thereby obtaining a supra-stoichiometric to stoichiometric ratio of $H_2SO_4$ to $H_2O_2$, results in a higher active oxygen content from $H_2SO_5$. The resulting Caro's acid solution can be stabilized to maintain a high $H_2SO_5$ concentration. By stabilizing the Caro's acid solution and reducing the reverse reaction between $H_2SO_5$ and $H_2O$, a Caro's acid solution is produced which, upon partial neutralization with an alkali potassium, produces a PMPS triple salt having a K/S ratio of between 1.15 to 1.25. Such PMPS triple salt has an active oxygen content (A.O.) higher than that of PMPS triple salt made with conventional methods, and does not suffer from the drawbacks of $K_2S_2O_8$ formation.

Upon slow (continuous or incremental) addition of $H_2O_2$ and/or Caro's acid solution to $H_2SO_4$ under a temperature at or below 20° C., the rate of the forward reaction is initially high due to the excess $H_2SO_4$ and low $H_2O$ concentration. With continued addition of $H_2O_2$, the $H_2SO_5$ converts back to $H_2SO_4$. However, the controlled temperature suppresses the rate of conversion of $H_2SO_5$ even as the $H_2O$ concentration increases. The reversion rate is sufficiently reduced to allow for the benefits provided by the order of reactant addition to be utilized in the production of a triple salt composition. The resulting triple salt is substantially higher in A.O. than the conventional triple salt.

FIG. 1 is a flowchart of a triple salt production process 10 in accordance with the invention. The triple salt production process 10 includes a Caro's acid production process 20 and a conversion and separation process 30. In the Caro's acid production process 20, an $H_2O_2$ solution is slowly (e.g., incrementally) added to an $H_2SO_4$ solution, maintaining a substoichiometric ratio of $H_2SO_4{:}H_2O_2$ (step 22). Preferably, the $H_2O_2$ solution has a $H_2O_2$ concentration>70%. This slow addition increases the conversion of $H_2O_2$ to $H_2SO_5$ and increases the release of bound $H_2O$ from the $H_2O_2$. As a result, there is more free $H_2O$ in the solution. The resulting weak Caro's acid still contains residual $H_2O_2$ and free $H_2O$, which lead to a higher active oxygen content. The amount of residual $H_2O_2$ is minimized by stopping its addition as soon as the stoichiometric molar ratio of $H_2SO_4{:}H_2O_2$ is reached or exceeded. The $H_2O_2$ and the $H_2SO_4$ are allowed to react for at least 0.1 hours (step 24).

Then, oleum is added (step 26) to the weak (i.e., substoichiometric molar ratio of total $H_2SO_4$ to $H_2O_2$) Caro's acid solution, which still contains residual $H_2O_2$ and free $H_2O$, to raise the molar ratio of $SO_4$ to $H_2O_2$ to at least the stoichiometric level. Upon the addition of oleum, the free $H_2O$ reacts with $SO_3$, per Reaction 2. By minimizing residual $H_2O_2$, formation of $H_2S_2O_8$ per Reaction 3 is minimized. After step 26, a rich Caro's acid is produced. The rich Caro's acid is optionally diluted (step 28). Temperature is maintained at a level<20° C. throughout the process 20 to stabilize the $H_2SO_5$.

The rich Caro's acid is subjected to the process 30 to form a PMPS triple salt with high A.O. and a substantially reduced amount of $K_2S_2O_8$ compared to the conventional triple salts. The diluted Caro's acid solution is partially neutralized with an alkali potassium compound (step 32) to achieve a K/S ratio greater than 1, preferably between 1.10 to 1.25. The partially neutralized solution is concentrated to form a slurry (step 34), for example by mixing in a vacuum evaporator. The slurry is then separated into mother liquor and solids (step 36), wherein the solids contain the desired PMPS composition. The solids are dried (step 38), preferably at a temperature<90° C. and more preferably at a temperature<70° C., to obtain a PMPS composition that does not have much $H_2O$. The resulting PMPS composition has an active oxygen content higher than 4.3 and has substantially no irritant ($K_2S_2O_8$).

The PMPS triple salt formed with the method of FIG. 1 is usually solid at room temperature.

1. Recipe #1

28.54 g of 70% $H_2O_2$ (approx. 0.59 mol $H_2O_2$) was added drop-wise to 60.02 g of vigorously agitated 93% $H_2SO_4$ (approx. 0.57 mol $H_2SO_4$) while controlling the temperature with an ice/brine solution between 5–8° C. The addition took 2.5 hrs and produced a Caro's acid solution from almost a 1:1 molar ratio of $H_2SO_4$ to $H_2O_2$.

The Caro's acid solution was allowed to react with vigorous agitation for 60 minutes while the temperature was maintained at 2–5° C.

The Caro's acid solution was diluted with 47.5 g deionized $H_2O$ by addition of the Caro's acid to the water with vigorous agitation while controlling the temperature between 10–15° C.

48.78 g $K_2CO_3$ was diluted with 66.98 g deionized $H_2O$. This solution was added drop-wise to the vortex of the vigorously agitated solution of diluted caro's acid to raise the K/S ratio to 1.2. Temperature was varied between 11–17° C. Total lapsed time to complete the addition was 18 minutes.

The solution was transferred to a glass evaporation tray and placed on a hot plate. A fan was used to increase air circulation and reduce the pressure above the solution. The temperature was controlled between 28–30° C. while continuous mixing was applied.

After 1.75 hrs, the solution was concentrated to a thick paste. The paste was spread across the tray and the temperature was increased to induce drying. The triple salt was periodically mixed and crushed to increase the efficiency of drying. The resulting triple salt had an A.O. content of 4.82% and no $K_2S_2O_8$.

This Example produces a triple salt composition having an A.O. that is 12% greater than the level that is expected from the equilibrium between a 1:1 molar ratio of 96% $H_2SO_4$ to 70% $H_2O_2$. Also, the triple salt produced in this Example has a higher $KHSO_5$ content than the triple salts produced using some of the well known methods. These results clearly demonstrate that the rate of the equilibrium reaction can be suppressed to benefit from the supra-stoichiometric ratio induced by the order of reactant addition for the formation of a triple salt composition.

2. Recipe #2

20.54 g of 76% $H_2O_2$ (approx. 0.46 mol $H_2O_2$) was slowly added to 10.02 g 98% $H_2SO_4$ (approx. 0.1 mol $H_2SO_4$).

46.67 g of 26% oleum was slowly added through a drip tube to the weak Caro's acid over a period of 1.5 hours.

The temperature was maintained at between −2 to 8° C. during both steps of the Caro's acid production.

The rich Caro's acid solution was added to 47.23 g deionized $H_2O$ while controlling the temperature between 0–6° C.

48.89 g $K_2CO_3$ was diluted with 59.95 g of deionized $H_2O$ and slowly added to the cortex of the rich Caro's acid, K/S 1.18.

The solution was concentrated using evaporation techniques described in the previous examples to a thick paste. 1.02 g magnesium carbonate hydroxide pentahydrate was added, then the solids were dried.

The resulting triple salt contains 6.3% A.O. and no $K_2S_2O_8$.

This Example illustrates that $H_2O$ bound in the $H_2O_2$ can be effectively released by utilizing the steps of the invention, then reacted with $SO_3$ in the oleum to produce a triple salt free of $K_2S_2O_8$.

3. Recipe #3

Add a supra-stoichiometric ratio of 70–99.6% $H_2O_2$ to agitated 90–100% $H_2SO_4$ while controlling the temperature at $\leq 20°$ C., and preferably $\leq 15°$ C., and more preferably $\leq 10°$ C. The resulting weak Caro's acid solution is converted to a rich Caro's acid solution by slowly or incrementally adding to a solution of 1–75% oleum while controlling the temperature at $\leq 20°$ C., preferably $\leq 15°$ C., and more preferably $\leq 10°$ C. to produce a rich Caro's acid solution.

Figure 2:
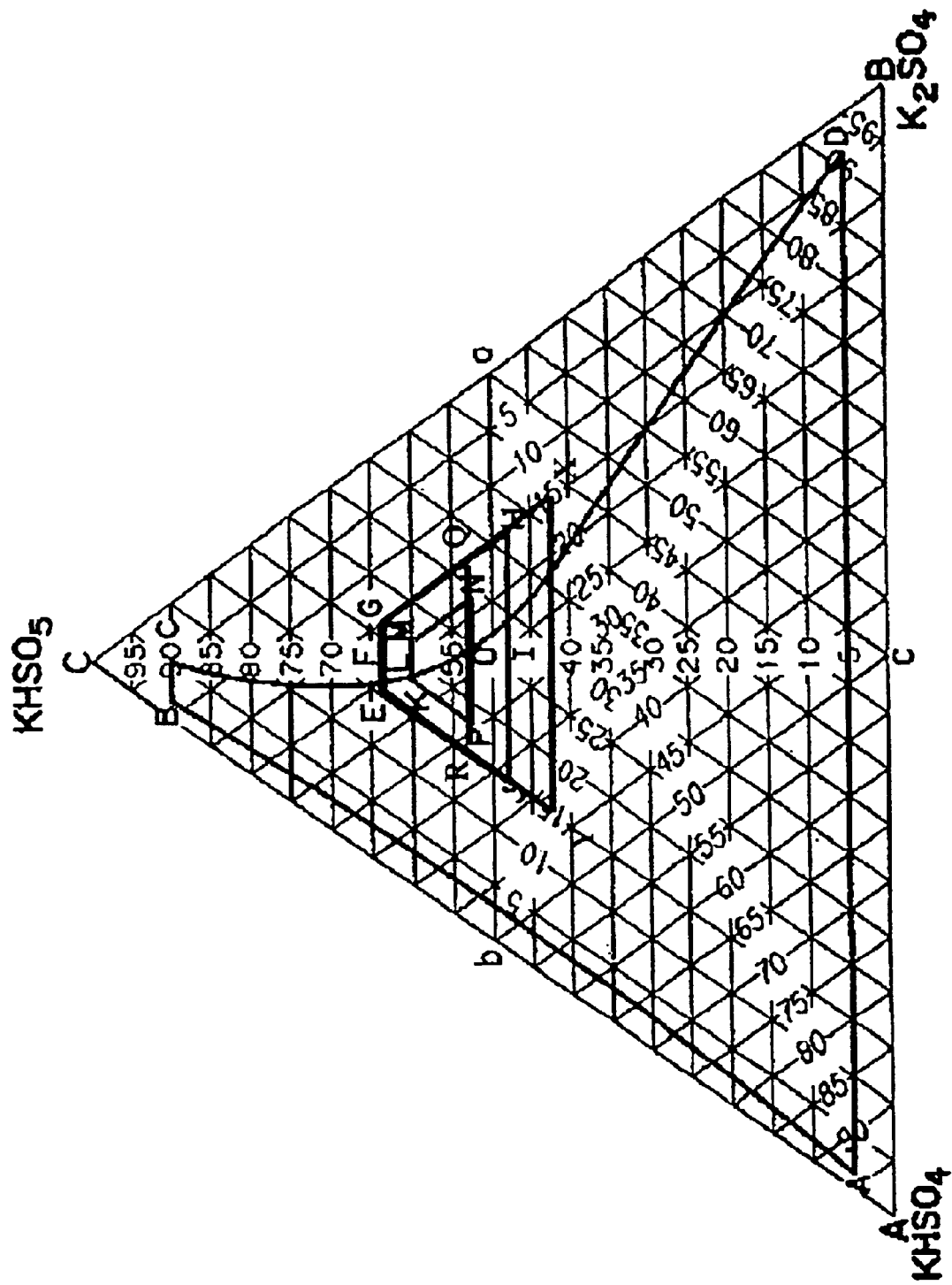
FIG. 2 is a tertiary diagram of a potassium monopersulfate composition that is suitable for the invention.

The partially neutralized triple salt resulting from the use of the resulting Caro's acid is further processed to produce a nonhygroscopic triple salt defined by the enclosed curve EGXYE, and more specifically EGHJE in FIG. 2 with<0.1 wt. % $K_2S_2O_8$, and having the general formula: $(KHSO_5)_x \cdot (KHSO_4)_y \cdot (K_2SO_4)_z$, where x+y+z=1 and x=0.53–0.64, y=0.15–0.33, and z=0.15–0.33.

Second Example of Low-oxodisulfate PMPS Production

A PMPS composition was produced by introducing concentrated $H_2O_2$ into concentrated $H_2SO_4$ using a single stage reactor, then partially neutralizing with $K_2CO_3$, evaporated to a viscous slurry, mixed with 2 wt. % magnesium carbonate hydroxide pentahydrate, and dried using vacuum evaporation techniques, resulted in a stable, nonhygroscopic triple salt.

PMPS that is suitable for the invention may also be generated using the method and apparatus disclosed in U.S. patent application Ser. No. 10/878,176, which is incorporated by reference herein.

Figure 3:
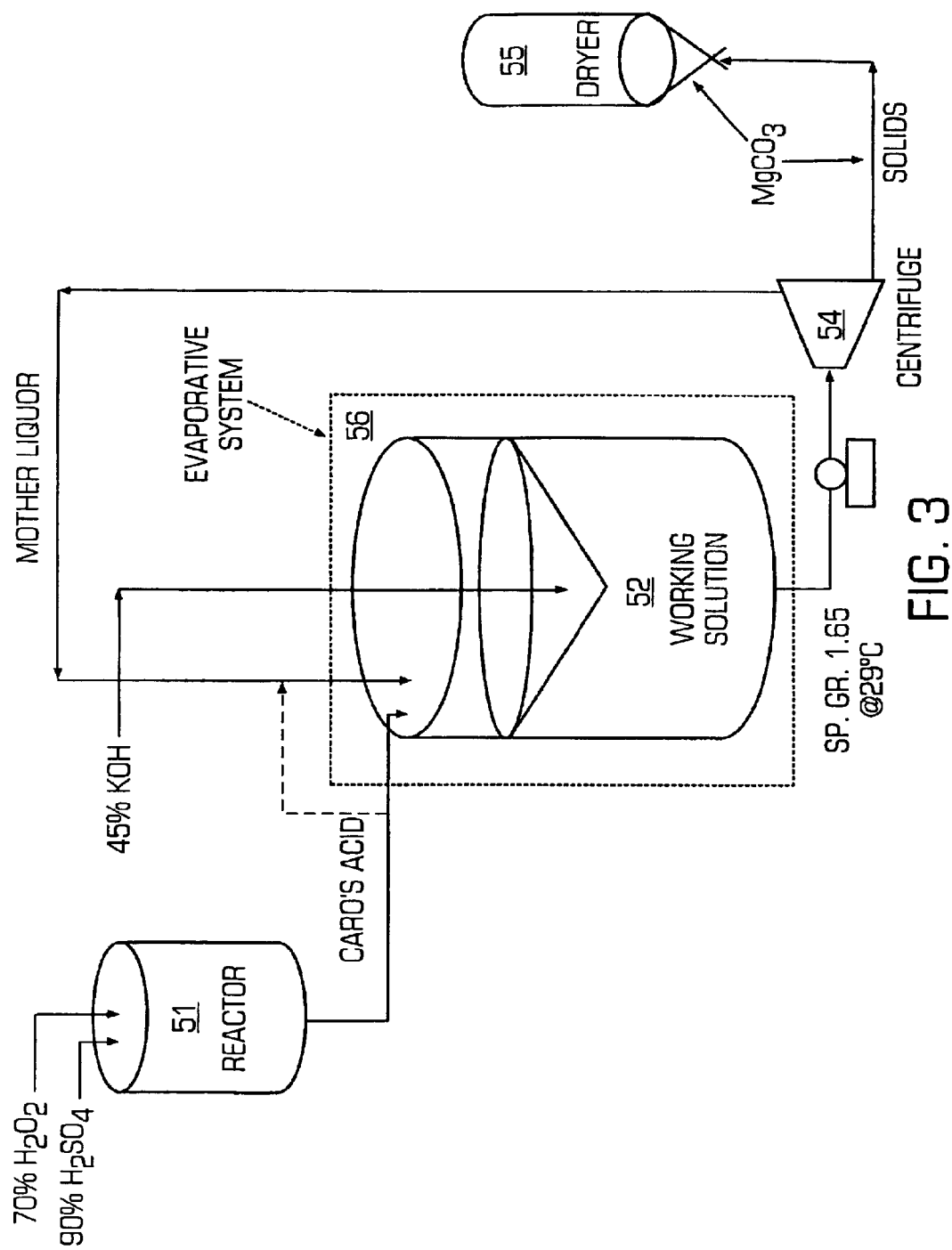
FIG. 3 is a continuous process system that may be used to produce the potassium monopersulfate composition that is suitable for the invention.

FIG. 3 is a continuous process system 50 that may be used to implement the invention. The process system 50 includes a reactor 51 where the sulfur source solution (e.g, $H_2SO_4$) and the peroxide solution are reacted to generate Caro's acid. In addition, the system 50 includes a working tank 52, a slurry pump 53, a centrifuge 54, and a dryer 55. The Caro's acid generated in the reactor 51 is combined with an alkali potassium salt in the working tank 52 to generate the PMPS triple salt, which is in the form of a slurry. The slurry containing the triple salt is pumped by the slurry pump 53 into the centrifuge 54, which separates the slurry into solids and mother liquor. The slurry contains at least 30 wt. % solids, as determined by the specific gravity of the slurry being greater than 1.55 at 29° C. The mother liquor is recycled back into the working tank 52. The mixture of the recycled mother liquor, the Caro's acid, the alkali potassium salt, and the slurry in the working tank 12 is herein referred to as the "working solution." The working solution is concentrated by being mixed in a vacuum evaporator 16 at a temperature less than or equal to 35° C.

The rate of the reaction between $H_2SO_5$ and $H_2O$ changes with temperature and with the order of reagent addition. Thus, by controlling the temperature and the order in which reagents are introduced to produce Caro's acid, a Caro's acid solution having an $H_2SO_5$ concentration that is substantially higher than that of currently available Caro's acid solutions can be produced. Furthermore, by shifting the reaction rate by manipulating temperature, the Caro's acid with high $H_2SO_5$ concentration can be stabilized. The stabilized Caro's acid solution may be used for various purposes, one of which is the production of the PMPS triple salt. The PMPS triple salt prepared with the high-$H_2SO_5$ Caro's acid solution has an A.O. level that is substantially higher than that of conventional PMPS triple salts.

In one aspect, the invention pertains to the reactor 51. The reactor 51 can be designed based on the discovery that the Caro's acid equilibrium reaction is affected by both the temperature and the order of reagent introduction. If the reactants are added in the right order under the right temperature to favor the formation of $H_2SO_5$, and if the resulting product is stabilized until all the reactants are added and the reaction is complete, Caro's acid production is optimized for high $H_2SO_5$ concentration. High $H_2SO_5$ concentration translates into decreased waste product and reduces the production cost. Furthermore, a high concentration of $H_2SO_5$ results in a higher concentration of $KHSO_5$, and a Caro's acid solution having a higher molar ratio of $KHSO_5/H_2SO_4$ can be used to prepare a stable, non-hygroscopic PMPS triple salt composition that has an active oxygen greater than the currently reported maximum of 4.3%. To prepare a useful version of the high-A.O. PMPS triple salt, the increased concentration of $H_2SO_5$ has to be stabilized, and the reactor of the invention allows $H_2SO_5$ to be stabilized.

Initially, when $H_2O_2$ is added to a solution of $H_2SO_4$, the molar ratio of $H_2SO_4$ is many times higher than the $H_2O_2$ and the rate of conversion in the forward reaction is high.

When the temperature is kept to below or at 20° C., the rate of the reverse reaction (Reaction 1b) is suppressed, maintaining a high concentration of $H_2SO_5$. However, as the addition of $H_2O_2$ continues, the molar ratios of $H_2O_2$ and $H_2SO_4$ become closer to 1.0, the concentration of $H_2O$ increases, and the rate of the forward reaction is reduced. Thus, while the initial rate of reactants' conversion to $H_2SO_5$ is higher than that achieved if $H_2SO_4$ were to be added to $H_2O_2$ or if both reactants were combined at once, the benefits of controlling the order of addition are lost with time due to the effects of the reverse reaction. The reverse reaction ultimately lowers the active oxygen level in the PMPS triple salt that is produced with the resulting Caro's acid solution. Thus, measures are needed to stabilize the high-$H_2SO_5$ solution and suppress the reverse reaction.

The reactor achieves a high-$H_2SO_5$ level in a Caro's acid solution by allowing the reactants to mix a portion at a time. More specifically, the reactor is designed such that a peroxide concentration gradient forms in an oxyacid solution, as a function of distance from the inlet through which the peroxide solution is introduced. Due to the concentration gradient, only a portion of the oxyacid solution reacts with the peroxide at a given time. There is a stirring mechanism in the reactor that allows a controlled dissipation of this concentration gradient. The effect of the stirring is that after the peroxide and the oxyacid react to form $H_2SO_5$ in an area of high peroxide concentration, the $H_2SO_5$ is stirred away from the area where the reaction occurred, preventing the reverse process from being triggered and allowing more $H_2SO_5$ to form as more peroxide solution is introduced. Since the reverse reaction becomes significant only after the gradient dissipates (i.e., cannot stir the $H_2SO_5$ away to an area free of $H_2O_2$), the Caro's acid solution is moved to the next stage, e.g., the working tank 52 in FIG. 1, when the gradient dissipates.

Oleum, which is rich in $SO_3$, may be added to the $H_2O_2$ to convert water present in the peroxide solution since reducing the water concentration helps drive the forward reaction. Oleum also consumes some of the water that is released from the peroxide during the forward reaction. The reaction of oleum and water proceeds as follows:

$$H_2O + SO_3 \ggg H_2SO_4 \quad \text{(Reaction 2)}$$

As the molar ratio of oleum to $H_2O_2$ approaches 1.0, the ratio of free $H_2O$ to $SO_3$ is significantly reduced, and $SO_3$ begins reacting directly with $H_2O_2$ as illustrated by the following formula:

$$2\,SO_3 + H_2O_2 \ggg H_2S_2O_8 \quad \text{(Reaction 3)}$$

The production of $H_2S_2O_8$ is undesirable, as it may ultimately result in the formation of the irritant $K_2S_2O_8$.

In order to achieve high active oxygen, sufficient oleum is added to convert as much of the $H_2O_2$ as is economically permitted. Generally, the molar ratio of sulfur from oleum to peroxide is generally 1.1 to 1.6, with 1.18 being frequently recited.

To prevent or eliminate $K_2S_2O_8$, elaborate process control to balance the slurry chemistry between recycled mother liquor and neutralized Caro's acid solutions may be used. Also, triple salt solution may be treated with alkali potassium salts to precipitate and remove unwanted $K_2SO_4$, thereby enriching the $KHSO_5$ content. Alternatively, extra $H_2SO_4$ and KOH may be added to the triple salt solution to dilute the $K_2S_2O_8$.

In order to produce a stable, non-hygroscopic triple salt composition high in A.O. with substantially no $K_2S_2O_8$, several criteria must be met. First, it is desirable to stabilize $H_2SO_5$ immediately after its formation, to prevent reversion back to the reactants $H_2SO_4$ and $H_2O_2$ according to the reverse reaction of Reaction 1b. Second, residual (free) $H_2O$ must be minimized to maximize the yield in $H_2SO_5$. This can be accomplished by using reactants in the highest range of activity as possible.

Where oleum is used in any of the reaction steps, the feed-rate of oleum, and molar ratio of oleum to $H_2O_2$ must be controlled within specific guidelines to prevent formation of $H_2S_2O_8$ by Reaction 3 above.

Reducing the Dissolution Rate of PMPS

For applications where intermittent or continuous low level feed results by introducing the PMPS composition into the pool water or somewhere in the circulating system such as a strainer of chemical erosion feeder, the rate of dissolution must be controlled to provide controlled release while limiting the addition of compounds that themselves would provide contaminants to the treated water.

The oxodisulfate-free PMPS is treated with chitosan by atomizing a 2 wt. % solution of chitosan dissolved in a solvent, such as a solvent containing an organic acid. A dilute acetic acid solution may be used as the solvent for chitosan. The PMPS was fluidized in a fluidized drier to which the chitosan solution was atomized and directed countercurrent to the flow of air through the drier. A 2-wt. % chitosen coating was applied and allowed to dry. Sodium metasilicate coating and a combination coating containing both metasilicate and chitosen were used for comparison.

Small sample where measured and added to 200 ml of water at approximately 62° F. The samples were monitored until no powder was visible to the naked eye near the bottom of the beaker.

| Weight (gm) | Description | Lapsed Time (min:sec) |
|---|---|---|
| 0.15 | <425 micron PMPS | 2:45 |
| 0.15 | <425 micron w/3.5 wt % metasilicate coating | 3:52 |
| 0.15 | <425 micron PMPS w/2.5 wt % chitosan | 4:25 |
| 0.15 | <425 micron PMPS w/3.5 wt % metasilicate/ 1.5 wt % chitosan | 5:25 |

The results of this test clearly illustrate that the dissolution rate of a highly soluble PMPS composition can be reduced by applying a coating of a proper composition. The wt. % of coating and the type of coating composition alter the dissolution rate. The dissolution rate is also affected by the shape of the PMPS composition, which in turn affects the amount of surface area. For example, forming the coated composition into a pressure-formed tablet and appropriately controlling the size may reduce the surface area exposure of the composition to water, thereby decreasing the decomposition rate. A "tablet," as used herein, can be of any shape including but not limited to a briquette, a sphere, a disk, a granule, a nugget, a shape having a regular or irregular polygonal cross section, or any convenient geometric shape.

Another benefit of PMPS composition employing a chitosan coating comes from the reactivation of chitosan during the dissolution process of the PMPS composition. The reactivation of chitosan contributes to the removal of organic matters in the water.

Water Treatment Using a Liquid Form of PMPS Triple Salt

The PMPS triple salt may be used in liquid form. The prepare the liquid form of PMPS triple salt, the PMPS composition disclosed is dissolved in water using any number of dry product feed devices. For example, a tank with a mixer and a pump may be used. Alternatively, a chemical feeder which contains the PMPS composition may be used to allow water to dissolve some or all of the composition before delivering a solution of the composition to the water to be treated. Using the chemical feed, the composition may be applied by periodically using a timer, or by manually activating the feed system. The method allows for frequent incremental feed or continuous feed of the composition even when bathers are present, without concern of causing irritation. "Frequent incremental feed," as used herein, refers to a feed of at least one cycle per day.

Treatment Using a Solid Form of PMPS Triple Salt

The PMPS powder composition described above may be treated with a coating, then formed into a tablet to be applied to a water system. The PMPS tablet is inserted into a feeder, strainer, or any location in the pool or pool circulating system that is continuously or periodically immersed in the water to be treated. This method allows for controlled release of the composition to provide oxidation of COD regardless of the presence of contaminants (e.g., bathers), without causing irritation to the bathers.

Illustration of the Benefits of Adding PMPS to an Organic Laden Water

Figure 4:
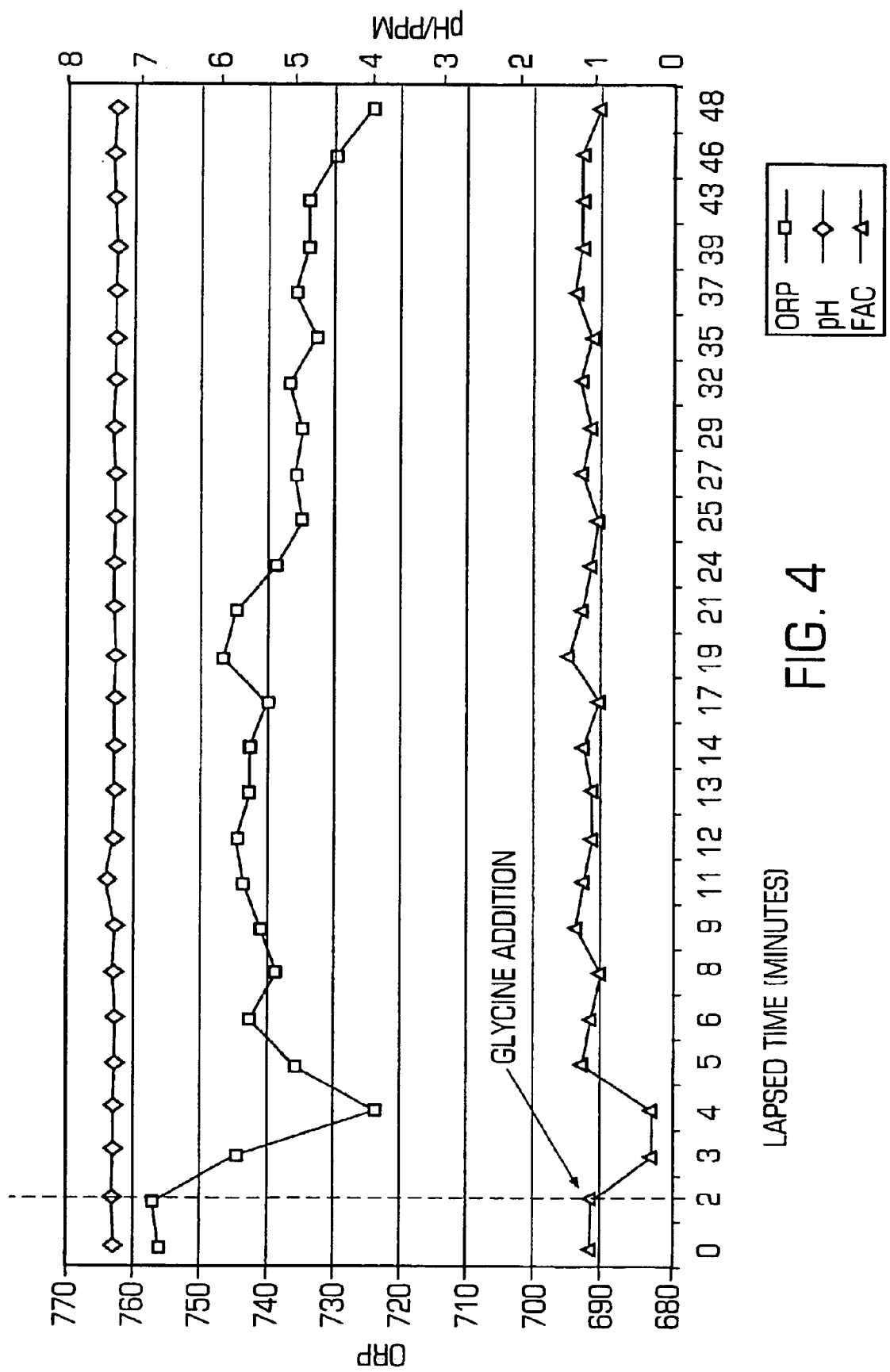
FIG. 4 is a plot showing the effect of organic contaminants and chlorine addition on the Oxidation Reduction Potential (ORP) of a water system.

FIG. 4 is a plot showing the effect of organic contaminants and chlorine addition on the Oxidation Reduction Potential (ORP) of a water system. The organic contaminants is provided in the form of glycine in the case illustrated in FIG. 3. For a given pH and Free Available Chlorine (FAC), the ORP is severely affected by the presence of organic contaminants (chemical oxygen contaminants (COD)). After 45 minutes of continuous treatment with chlorine, the system still can not recover to the equilibrium conditions achieved prior to the glycine addition.

Figure 5:
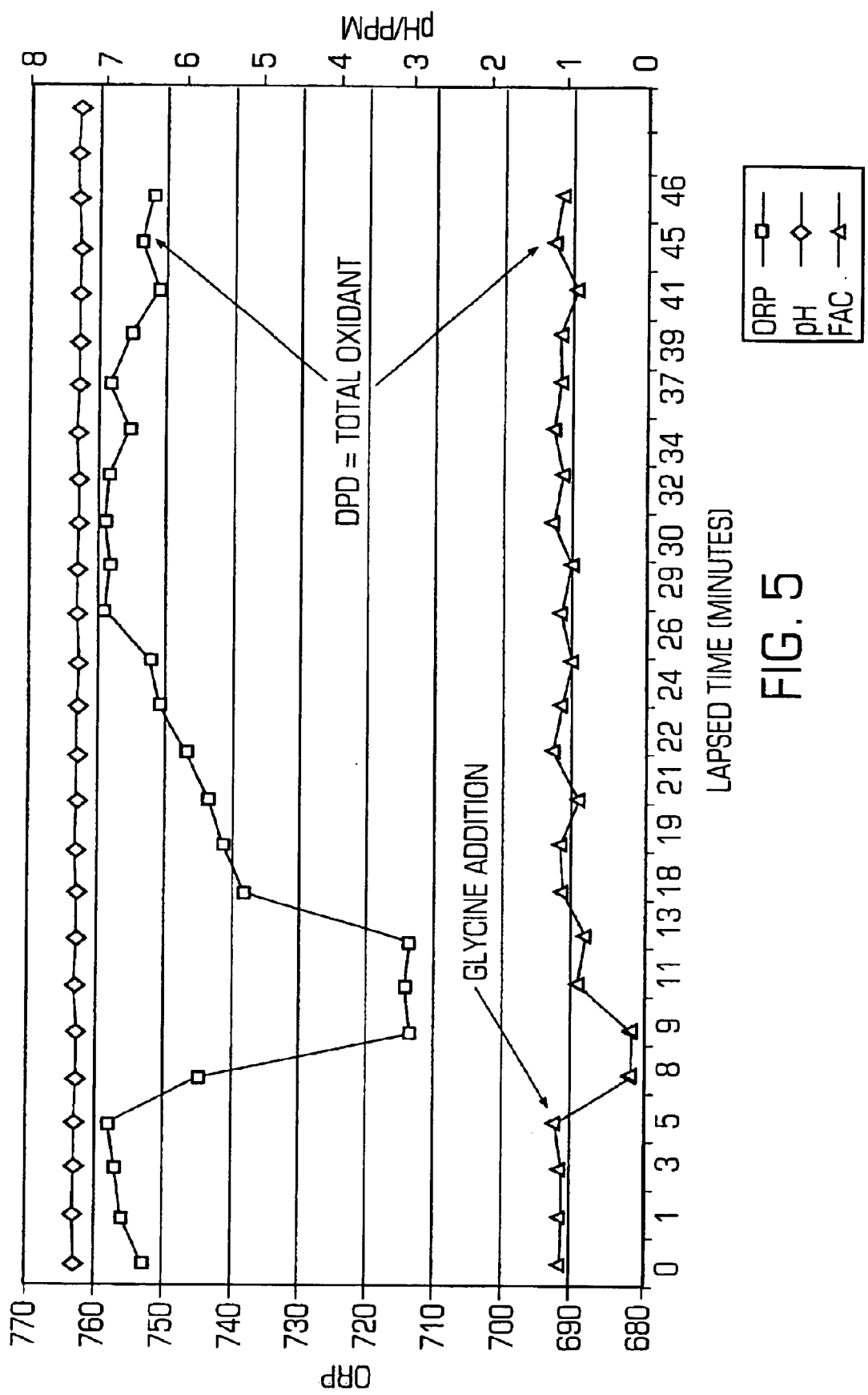
FIG. 5 is a plot showing the effect of chlorine and PMPS addition on the water system of FIG. 3.

FIG. 5 is a plot showing the effect of chlorine and PMPS addition on the water system of FIG. 3. As shown, using chlorine and PMPS affects the ORP range compared to the case where chlorine is used alone. During the treatment period, the ORP is sustained at substantially higher levels than the PMPS-free system. FIG. 5 also illustrates that the system treated with the PMPS and a sustained chlorine level achieved pre-glycine equilibrium conditions in far less time than is achievable by chlorine alone.

Results illustrate that PMPS is far more effective at reducing the rate of decomposition of the organic contaminants application if PMPS is added while contaminants (e.g., bathers) is present than if PMPS is added to a pool/spa during evacuation. When added to a water system while contaminants is present, the PMPS also supports higher ORP than when the PMPS is added during evacuation, and the higher ORP correlates with improved disinfection rates.

Determination of $K_2S_2O_8$

To exploit the above effects of PMPS on water systems, the PMPS composition must be substantially free of harsh irritants such as $K_2S_2O_8$. To be able to use the PMPS composition without evacuating the pool/spa, or to increase the dosage that is used while the water system is not being used, the PMPS must be substantially free of $K_2S_2O_8$.

Figure 6:
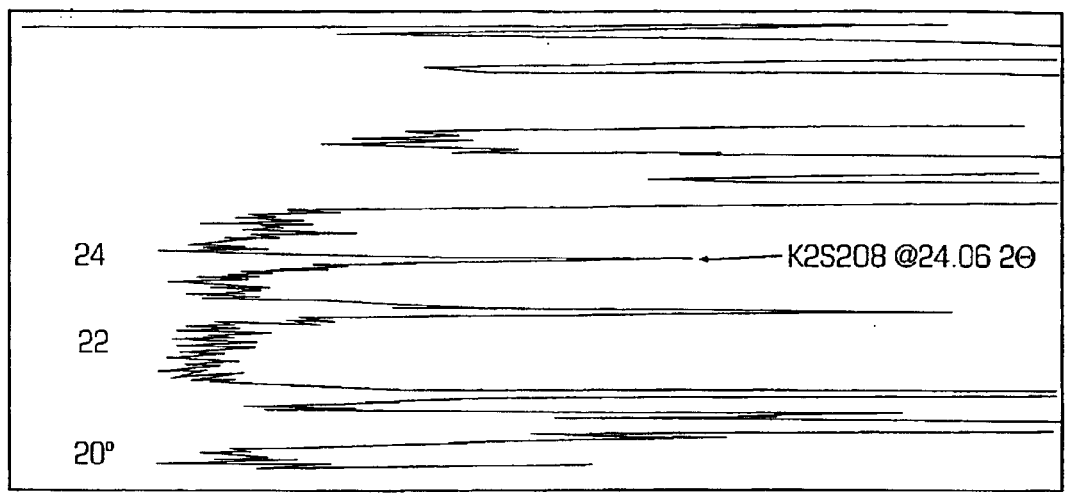
FIG. 6 is an X-Ray Diffraction Spectroscopy result of a potassium oxodisulfate sample showing the characteristic peak at 24.06 degrees 2θ.

FIG. 6 is an X-Ray Diffraction Spectroscopy result of a sample of potassium persulfate (also called potassium oxodisulfate, $K_2S_2O_8$), whereby a signature peak specific to $K_2S_2O_8$ is indicated.

Figure 7:
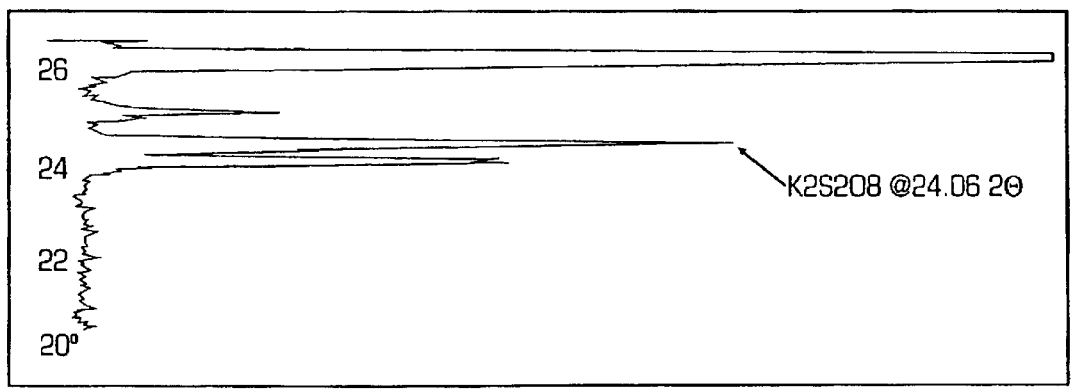
FIG. 7 is an X-Ray Diffraction Spectroscopy result of the commercially available Oxone® potassium monopersulfate triple salt.

FIG. 7 is an X-Ray Diffraction Spectroscopy result of a sample of commercially available triple salt sold under the brand name Oxone® by E.I. DuPont. The signature peak for $K_2S_2O_8$ is indicated in the Figure.

Figure 8:
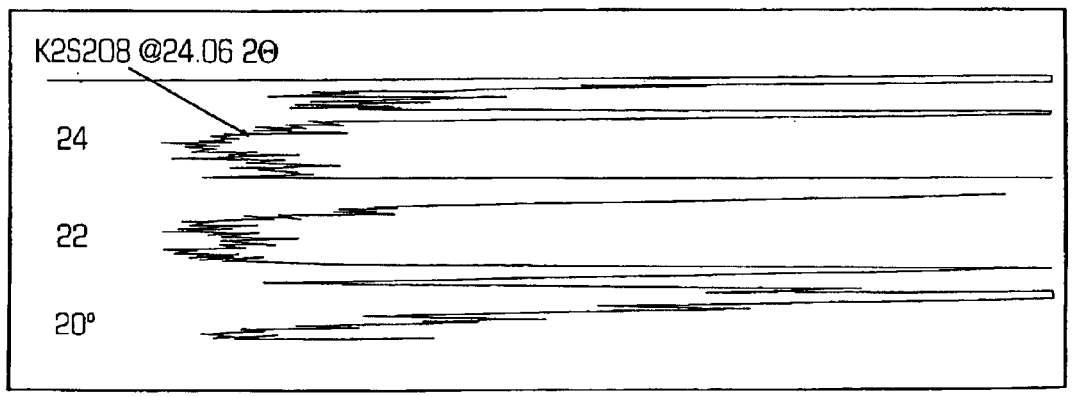
FIG. 8 is an X-ray Diffraction Spectroscopy result of a potassium monpersulfate triple salt produced according to the methods of the invention.

FIG. 8 is an X-Ray Diffraction Spectroscopy result of the PMPS composition produced by using the process described above. The lack of the characteristic $K_2S_2O_8$ peak illustrates that the triple salt is free of detectable levels of $K_2S_2O_8$.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. A method of reducing the chemical oxygen demand of a water system containing organic contaminants, the method comprising:

generating a potassium monopersulfate composition having a $K_2S_2O_8$ concentration that is lower than 0.5 wt. % of the composition;

coating the potassium monopersulfate composition with a film to form a coated tablet, wherein a material for the film is selected based on a target rate at which the coated tablet dissolves in a predetermined type of fluid.

2. The method of claim 1 further comprising shaping the coated tablet into a desired shape and size, wherein the shape and size are selected based on the target rate at which the coated tablet dissolves in the fluid.

3. The method of claim 1, wherein generating the potassium monopersulfate composition comprises:

reacting $H_2SO_5$ with a potassium alkali salt to produce a slurry containing solids; and drying the solids at a temperature below 90° C.

4. The method of claim 3 further comprising producing $H_2SO_5$ by reacting $H_2O_2$ with $H_2SO_4$ at a $H_2SO_4$ to $H_2O_2$ molar ratio of at least one.

5. The method of claim 3 further comprising producing $H_2SO_5$ is a single reactor stage.

6. The method of claim 1, wherein the film comprises a polysaccharide material.

7. The method of claim 6, wherein the film comprises an organic polymer layer containing about 0.1–10 wt. % polysaccharide.

8. The method of claim 7, wherein the polysaccharide material is one or more of: cellulose, dextran, pectin, alginic acid, agar, agarose, carragenans, chitin, and chitosan.

9. The method of claim 1, wherein the film comprises a silicate material.

10. The method of claim 1, wherein the potassium monopersulfate composition is a particle having an average diameter of less than 425 µm.

11. The method of claim 1, wherein the potassium monopersulfate composition comprises $KHSO_5$, $KHSO_4$, and $K_2SO_4$, and wherein $KHSO_5$ makes up about 43 to about 75 wt. % of the composition.

12. The method of claim 1, wherein the potassium monopersulfate composition comprises an alkali magnesium salt, the alkali magnesium salt being selected from a group consisting of $Mg(OH)_2$, $MgCO_3$, $Mg(HCO_3)_2$, $MgO$, $(MgCO_3)_4$-$Mg(OH)_2$-$5H_2O$, $CaMg(CO_3)_2$, $MgO$-$CaO$, and $Ca(OH)_2$-$MgO$ and making up no more than about 10 wt. %.

13. The method of claim 1, wherein the potassium monopersulfate composition has a $K_2S_2O_8$ concentration that is lower than about 0.2 wt. %.

14. The method of claim 1, wherein the organic contaminants are produced by a mammal.

15. The method of claim 1 further comprising depositing a silicate layer over the potassium monopersulfate composition, wherein no more than about 10 wt. % of the silicate layer is silicate or borosilicate.

16. The method of claim 15, wherein the silicate layer comprises one or more of sodium silicate, potassium silicate, lithium silicate, magnesium silicate, calcium silicate alkyl silicate, sodium borosilicate, potassium borosilicate, lithium borosilicate, magnesium borosilicate, calcium borosilicate, and alkyl borosilicate.

17. The method of claim 15, wherein depositing the silicate layer comprises applying a silicate material to the PMPS composition in the form of foam, liquid, colloidal suspension, or a solid.

18. The method of claim 15 further comprising drying the silicate layer at a temperature of<90° C.

19. The method of claim 1, wherein the predetermined type of fluid is a fluid in the water system.

20. A method of reducing the chemical oxygen demand of a water system containing organic contaminants, the method comprising:

obtaining a tablet of a potassium monopersulfate core coated with a film; and adding the tablet to the water system while a source that generates the organic contaminants is in the water system.

21. The method of claim 20, wherein adding the tablet to the water system comprises dissolving the tablet in the water system.

22. The method of claim 21, wherein adding the tablet to the water system comprises placing the tablet in continuous contact with the water system until the tablet is dissolved.

23. The method of claim 20, wherein adding the tablet in the water system comprises placing the tablet in contact with the water system for a predetermined length of time at a predetermined time interval.

24. The method of claim 20, wherein adding the tablet to the water system comprises:

dissolving the tablet in a solvent; and adding the solvent to the water system.

25. The method of claim 20, wherein adding the tablet to the water system comprises:

placing the tablet in a fixed location through which water flows; and circulating a stream in the water system such that the stream flows over the tablet.

26. The method of claim 20, wherein the film comprises a polysaccharide material.

27. The method of claim 26, wherein the polysaccharide material is one or more of: cellulose, dextran, pectin, alginic acid, agar, agarose, carragenans, chitin, and chitosan.

28. The method of claim 20, wherein the film comprises an organic polymer layer containing about 0.1–10 wt. % polysaccharide.

29. The method of claim 20, wherein the film comprises a silicate material.

30. The method of claim 20, wherein the potassium monopersulfate core is a particle having an average diameter of less than 425 µm.

31. The method of claim 20, wherein the potassium monopersulfate core comprises $KHSO_5$, $KHSO_4$, and $K_2SO_4$, and wherein $KHSO_5$ makes up about 43 to about 75 wt. % of the potassium monopersulfate core.

32. The method of claim 20, wherein the potassium monopersulfate core comprises an alkali magnesium salt, the alkali magnesium salt being selected from a group consisting of $Mg(OH)_2$, $MgCO_3$, $Mg(HCO_3)_2$, MgO, $(MgCO_3)_4$-$Mg(OH)_2$-$5H_2O$, $CaMg(CO_3)_2$, MgO-CaO, and $Ca(OH)_2$-MgO and making up no more than about 10 wt. %.

33. The method of claim 20, wherein the potassium monopersulfate core has a $K_2S_2O_8$ concentration that is lower than about 0.2 wt. %.

34. The method of claim 20, wherein the organic contaminants are produced by a mammal.

35. The method of claim 20, wherein the film comprises a silicate layer, wherein no more than about 10 wt. % of the silicate is silicate or borosilicate.

36. The method of claim 35, wherein the silicate layer comprises one or more of sodium silicate, potassium silicate, lithium silicate, magnesium silicate, calcium silicate alkyl silicate, sodium borosilicate, potassium borosilicate, lithium borosilicate, magnesium borosilicate, calcium borosilicate, and alkyl borosilicate.

37. A kit for cleaning a water system containing organic contaminants, the kit comprising:

a potassium monopersulfate tablet coated with a film that dissolves in a fluid at a predetermined rate; and instructions to add the tablet to the water facility while a mammal is in the water system.

38. The kit of claim 37, wherein the film comprises a polysaccharide material.

39. The kit of claim 38, wherein the polysaccharide material is one or more of: cellulose, dextran, pectin, alginic acid, agar, agarose, carragenans, chitin, and chitosan.

40. The method of claim 37, wherein the film comprises an organic polymer layer containing about 0.1–10 wt. % polysaccharide.

41. The method of claim 37, wherein the film comprises a silicate material.

42. The method of claim 41, wherein the silicate material contains no more than about 10 wt. % of silicate or borosilicate.

43. The method of claim 41, wherein the silicate material comprises one or more of sodium silicate, potassium silicate, lithium silicate, magnesium silicate, calcium silicate alkyl silicate, sodium borosilicate, potassium borosilicate, lithium borosilicate, magnesium borosilicate, calcium borosilicate, and alkyl borosilicate.

44. The method of claim 37, wherein the potassium monopersulfate tablet has an average diameter of less than 425 µm.

45. The method of claim 37, wherein the potassium monopersulfate tablet comprises $KHSO_5$, $KHSO_4$, and $K_2SO_4$, and wherein $KHSO_5$ makes up about 43 to about 75 wt. % of the potassium monopersulfate tablet.

46. The method of claim 37, wherein the potassium monopersulfate tablet comprises an alkali magnesium salt, the alkali magnesium salt being selected from a group consisting of $Mg(OH)_2$, $MgCO_3$, $Mg(HCO_3)_2$, MgO, $(MgCO_3)_4$-$Mg(OH)_2$-$5H_2O$, $CaMg(CO_3)_2$, MgO-CaO, and $Ca(OH)_2$-MgO and making up no more than about 10 wt. %.

47. The method of claim 37, wherein the potassium monopersulfate core has a $K_2S_2O_8$ concentration that is lower than about 0.2 wt. %.

* * * * *